April 24, 1962 M. H. LILL ET AL 3,030,815
WHEEL SPINNER
Filed Aug. 29, 1960 3 Sheets-Sheet 1
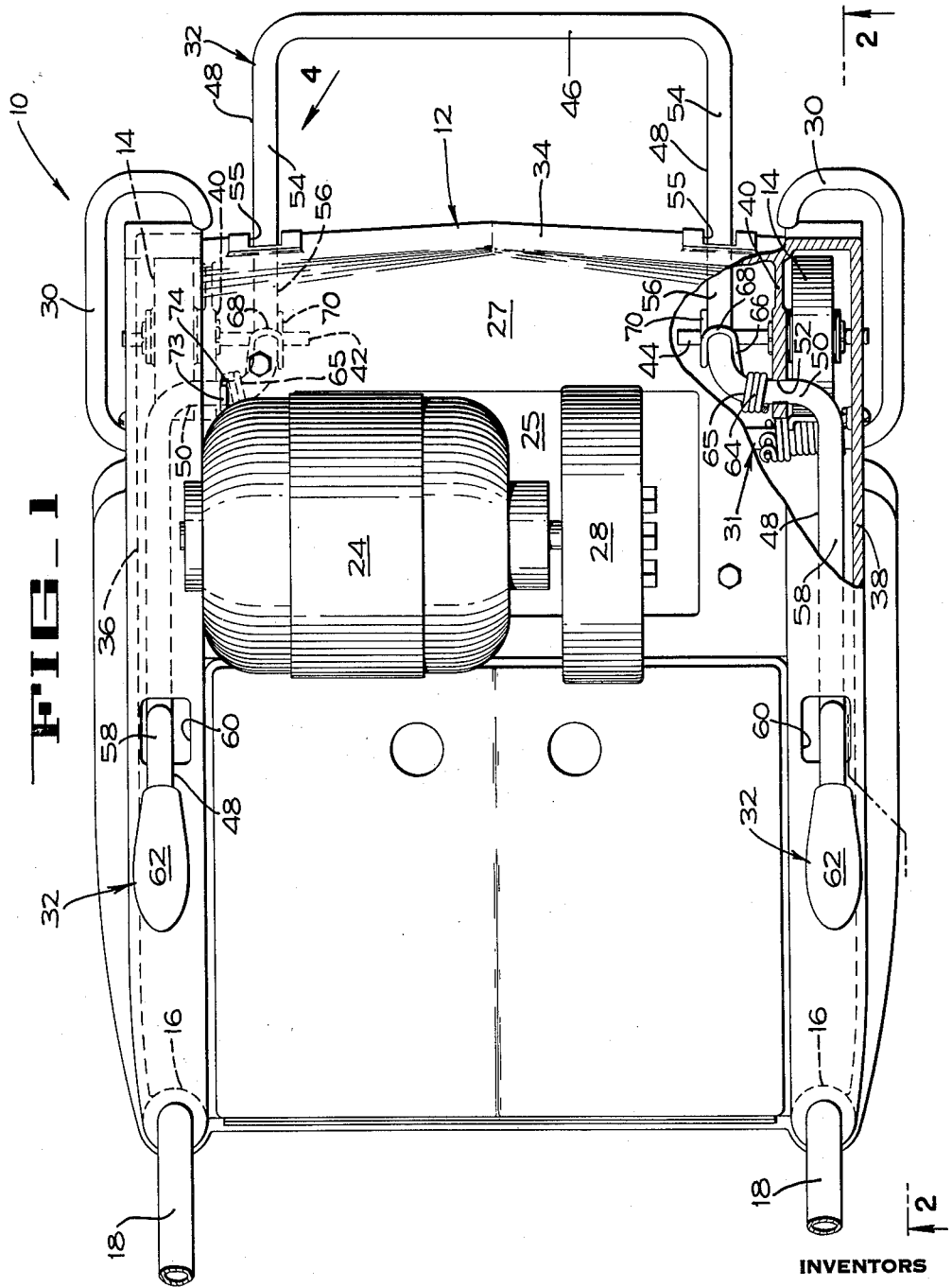
INVENTORS
MELVIN H. LILL
LANCE J. STAMPER
BY *Hans G. Hoffmeister*
ATTORNEY

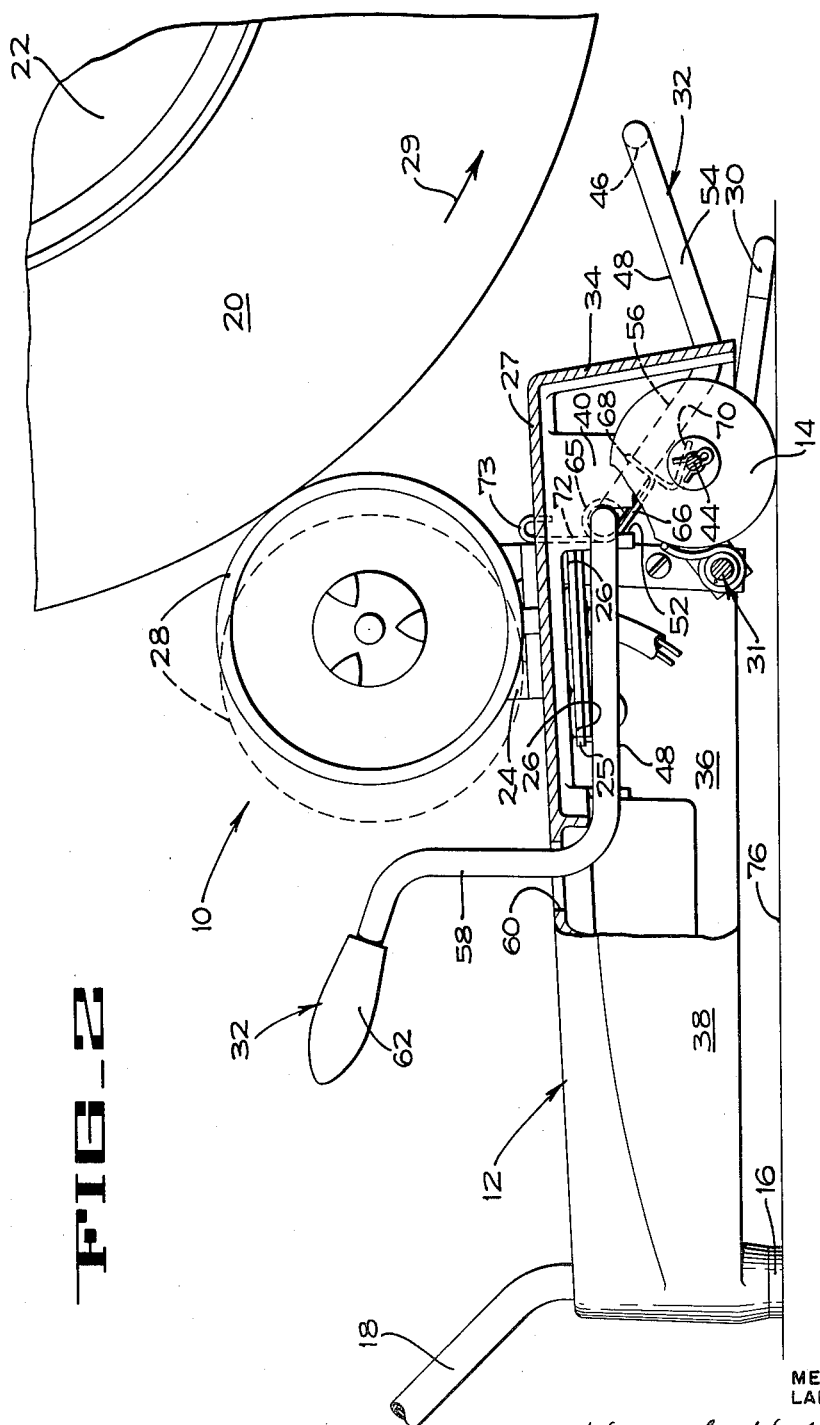

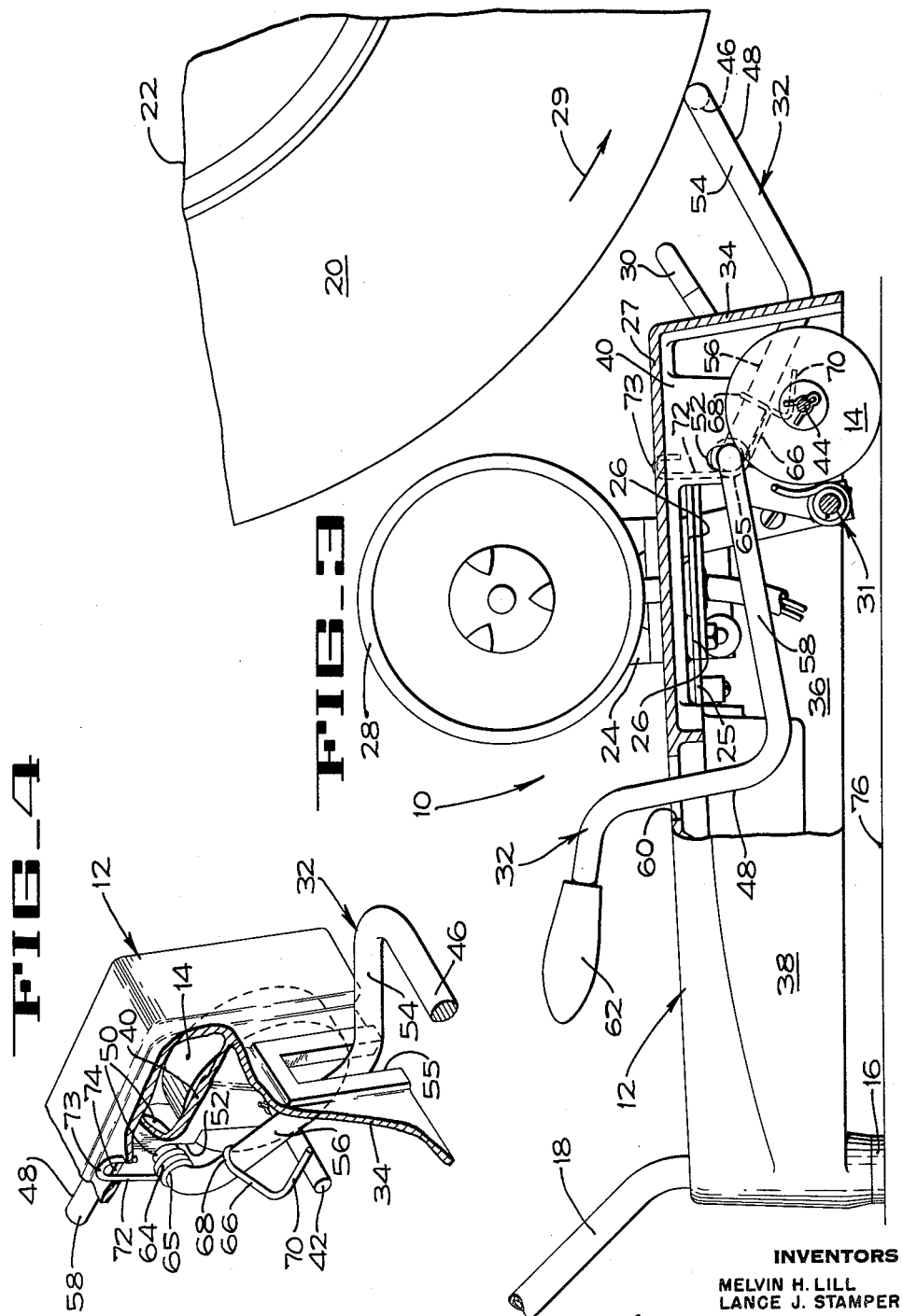

United States Patent Office 3,030,815
Patented Apr. 24, 1962

3,030,815
WHEEL SPINNER
Melvin H. Lill, East Lansing, and Lance J. Stamper, Lansing, Mich., assignors to FMC Corporation, San Jose, Calif., a corporation of Delaware
Filed Aug. 29, 1960, Ser. No. 52,521
15 Claims. (Cl. 74—16)

The present invention appertains to automotive service equipment and relates more particularly to a portable wheel spinner.

Equipment used in performing on-the-car wheel balancing operations on automobile wheels commonly includes a wheel spinner which may be used to drive or spin the wheels to attain a speed at which their unbalance becomes most pronounced. Regardless of how the wheels are spun, the wheel spinner is usually used to stop rotation or spinning of each wheel. Wheel spinners used in this manner are usually readily portable for easy movement from place to place and into operative position adjacent the tire of an automobile wheel which has been jacked up preparatory to performing the balancing operation. With the wheel spinner in operative position adjacent such a wheel and after the wheel has been driven to attain a suitable speed, the amount of unbalance and the location at which a balance weight or weights are to be attached to balance the wheel are determined by use of an on-the-car wheel balancer. Thereafter, the spinning wheel is brought to a stop by appropriate use of the wheel spinner.

Known wheel spinners require that they be physically restrained, by the person performing the balancing operation against movement with respect to the wheel concerned while applying a braking force to the wheel to stop its rotation. Heretofore, most of the operator's energy and attention has been required merely to hold the wheel spinner in operative position during the braking operation. As a result, the operator has been unable to predominately direct his attention and energy to use of the spinner in stopping rotation of the wheel and, therefore, the wheel stopping operation has been unnecessarily prolonged and laborious.

An object of the present invention is, therefore, to provide an improved wheel spinner.

Another object is to provide improved means in a portable wheel spinner for applying a braking force to a spinning automobile wheel during on-the-car wheel balancing operations.

Another object is to provide, in a portable wheel spinner, improved means for holding the spinner in operating position during the wheel stopping or braking operations.

Another object is to provide, in a portable wheel spinner movably mounted on transport wheels, improved means for locking the transport wheels against rotation to immobilize the wheel spinner during the wheel braking operation.

Another object is to provide in a wheel spinner of the character mentioned above, improved braking means which is operable during wheel balancing operations to simultaneously lock the transport wheels to immobilize the wheel spinner and to stop rotation of the spinning automobile wheel.

These and other objects and advantages of the present invention will become apparent from the following description and the accompanying drawings in which:

FIG. 1 is a plan of a portable wheel spinner with certain parts broken away and embodying the present invention.

FIG. 2 is an elevation partly in section along lines 2—2 of FIG. 1 with certain parts broken away.

FIG. 3 is similar to FIG. 2, but shows the structure of the present invention in a different operative position.

FIG. 4 is a perspective showing a fragment of the present wheel spinner as viewed in the direction indicated in general by the arrow 4 of FIG. 1.

The wheel spinner 10 of the present invention comprises a body 12 having a pair of transversely opposite transport wheels 14 adjacent its front end and transversely opposite support feet 16 adjacent its rear end. A substantially U-shaped handle 18 (only partly shown in FIGS. 1, 2, and 3) is attached to the rear portion of the body 12. The handle 18 is used by the operator in moving the spinner 10 on its transport wheels 14 from place to place as well as into position adjacent the tire 20 (FIGS. 2 and 3) of an automobile wheel 22 that is to be balanced. It will be understood that, previous to the use of the spinner 10 to rotate the wheel 22, an on-the-car wheel balancer (not shown) of any well known type, is connected to the wheel 22. It may be assumed, for purposes of illustration, that the wheel 22 is a front wheel of a standard automobile and that the wheel has been jacked up to permit its free rotation.

A motor 24 (FIG. 1), mounted on a plate 25 for fore-and-aft movement in guideways 26 (FIGS. 2 and 3) on a deck 27 of the body 12, is provided with a drive roller 28 to engage the tread of the tire 20 and drive the wheel 22 in the direction indicated by the arrow 29 (FIGS 2 and 3). While the spinner 10 is held in operative position adjacent the wheel 22, the operator depresses a lever 30 (FIG. 2) of a motor moving arrangement 31 to move the motor 24 and its drive roller 28 toward the wheel 22 and to start the motor 24. The roller 28 is thus moved from its standby position, shown in dotted lines in FIG. 2 and in full lines in FIG. 3, to its operative position, shown in full lines in FIG. 2, wherein it is in driving engagement with the tire 20 to rotate the wheel 22. When the wheel 22 attains a speed at which its unbalance becomes most pronounced, the amount of unbalance and the location at which a weight or weights are to be placed on the wheel 22 is determined by use of the on-the-car wheel balancer.

Thereafter, the roller 28 is disengaged from the tire 20 by releasing the lever 30 to retract the motor 24. The drive roller 28 is, thus, disengaged from the tire 20, thereby allowing the wheel 22 to spin freely under its own momentum. It will be understood that for an extended period of time after the wheel balancer is used, the wheel 22 will continue to spin rapidly unless its rotation is stopped by some external force. For this reason, it is necessary that a braking force be applied to the wheel. This should be done quickly after use of the balancer in order that the wheel may be promptly stopped to assure that the balancing operation will be completed without delay. In using the wheel spinner 10 of the present invention for this purpose, the operator stops the wheel's rotation by pressing, preferably with one of his feet, against a brake 32 to thereby move the same into braking engagement with the tire. This operation, in addition to stopping rotation of the wheel, simultaneously moves the brake 32 into engagement with the transport wheels 14 of the wheel spinner 10 to immobilize the same in operating position adjacent the wheel. It will therefore be apparent that the wheel spinner is immobilized concurrently with the wheel braking operation. Accordingly, while using the wheel spinner 10 of the present invention, it is unnecessary for the operator to exert any effort or give any attention to restraining the wheel spinner 10 against movement while bringing the wheel to a stop promptly.

As best shown in FIGS. 1 and 2 the body 12 is of generally rectangular shape and has a transverse front wall 34 and longitudinal, substantially parallel sidewalls 36 and 38 depending from the deck 27. Each transport wheel 14 is located between one of two opposite longitudinal webs 40, depending from the deck 27, and the adjacent side wall 36 or 38 near the front wall 34. The wheels 14 are rotatable on horizontal, transverse stub shafts 42 and 44, respectively, which are coaxially aligned and held against axial displacement in the walls 36 and 38, respectively, and the associated webs 40. It will be noted in FIG. 1 that the inner end portion of each of the shafts 42 and 44 projects a short distance inwardly of the body 12 beyond the associated web 40 for a purpose which will be explained presently.

The brake 32 is constructed from a bar of circular cross section and, as shown best in FIG. 1, is of modified U-shape having a bight 46 and opposite side arms 48. The arms 48 function as levers and are used to actuate the brake 32 and move the bight 46 into engagement with the tire's tread. Since the function of the bight 46 is to engage the tire 20 and stop rotation of the wheel 22, this portion of the brake 32 will hereinafter be referred to as the brake shoe. The arms 48 project generally at right angles to the bight or brake shoe 46 and are each laterally offset intermediate their ends to provide coaxially aligned trunnions 50 by which the brake is supported in the body 12. The trunnions extend transversely of the body 12 in parallel relation to the brake shoe 46 (FIG. 1).

The trunnions 50 are disposed in vertical, transversely aligned, open-bottomed guide slots 52 (FIGS. 2 and 4) in the webs 40. The guide slots 52 are located above and laterally of the rear portions of the transport wheels 14 and prevent fore-and-aft movement of the brake 32. The upper ends of the slots provide abutment stops which determine the upper position to which the trunnions 50 can be moved. It will be noted (FIG. 1) that the trunnions 50 overlie the transport wheels 14 which, therefore, prevent downward movement of the trunnions from the guides 52, as may be understood best from FIGS. 2 and 3.

Portions 54 of the arms 48 extend forward, from the trunnions 50 through suitable slots 55 (FIGS. 1 and 4), in the lower edge portion of the front wall 34, to movably dispose the brake shoe 46 in front of the body 12. The arm portions 54 are of V-shaped configuration (FIGS. 2, 3, and 4) and each includes a leg 56 which is inclined downward from the associated trunnion 50 (FIG. 4) so as to overlie the stub shaft 42 or 44, as the case may be.

Actuating portions 58 of the arms 48 project rearward from the trunnions 50 beneath the deck 27 and at a suitable distance from the trunnions extend upward through openings 60 in the deck 27. The distal or free ends of the actuating portions 58 project rearward above the deck 27, from adjacent the openings 60, to provide the brake 32 with conveniently located treadles or handles 62 for use in actuating the brake 32.

The central coils 64 (FIGS. 1 and 4) of torsion springs 65 are coiled about the trunnions 50, respectively, and serve as bearings in which the trunnions 50 are rotatable. One end portion 66 of each spring 54 projects forward from the coils 64 along the adjacent leg 56. Each end portion 66 has a loop 68 engaged over the associated leg 56. The distal end 70 of each end portion 66, beyond the loop 68, is located at a lower elevation than the leg 56 and projects approximately horizontally (FIGS. 2, 3, and 4) immediately above an associated stub shaft 42 or 44 for a purpose later to be made clear. The other end portion 72 of each spring 65 projects upward from the coils 64 and has a reverse bend 73 adjacent its outer end that is anchored in openings 74 in the deck 27.

The loops 68 engage the legs 56 to exert a suitable downward torsional force on the portion 54 of the brake 32. The end portions 66 of the springs 65, therefore, urge the brake shoe 46 downward (FIG. 2) to a position determined by engagement of the distal ends 70 of the springs 65 with the stub shafts 42 and 44 which serve as abutments for the ends 70. The ends 70 of the springs 65 engage the stub shafts or abutments 42 and 44 to limit further clockwise movement of the brake 32 (FIG. 2) and in so doing the springs 65 urge the trunnions 50 upward in the slots 52 to normally hold the trunnions against the tops or abutment stops in the slots 52. When located at the upper ends of the slots 52, the trunnions 50 cannot obstruct rotation of the transport wheels 14 and the wheels are free to turn during movement of the wheel spinner 10 thereon from place to place.

Let it be assumed that the wheel 22 is to be balanced and that the wheel spinner 10 is in operative position adjacent thereto as shown in FIGS. 2 and 3 and is supported by its transport wheels 14 and feet 16 on a support surface or floor 76. The wheel 22 is no longer being driven since the lever 30 has been released and the drive roller 28 of the motor 24 has been retracted and is in the standby position as shown in dotted lines (FIG. 2), and in full lines (FIG. 3). It may be further assumed that the amount of unbalance and the location on the wheel at which a balance weight or weights are to be placed has been determined, and that the rotation of the wheel is to be stopped by use of the brake 32. The operator presses one of the treadles 62 with one foot, or, if he chooses, presses one or both of the treadles with his hands in order to initially pivot the brake 32 in a counterclockwise direction (FIG. 2) against the force of the springs 65 and thereby move the brake shoe 46 into engagement with the peripheral surface of the wheel 22 (FIG. 3). During initial upward movement of the brake shoe 46, the ends 70 of the spring end portions 66 are lifted off the abutments 42 and 44. Accordingly, the trunnions 50 move downward in the slots 52, and the end portions 72 of the springs 65 slide downward in the openings 74 to cause the trunnions 50 to engage the transport wheels 14. Thereafter, during continued pivoting movement of the brake 32, the brake shoe 46 engages the tire. Therefore, any additional braking force applied to the tire 20 by means of the brake 32 serves to force the trunnions 50 downward more positively against the transport wheels 14 and to force the brake 32 more firmly against the wheel 22. Thus, the transport wheels 14 of the wheel spinner 10 are locked by the trunnions 50 against rotation and, since they engage the floor, the wheel spinner is immobilized or held in operating position adjacent the wheel 22 during the wheel braking operation. For this reason any vibrations resulting from engagement of the brake shoe 46 with the tire 20 of the rapidly rotating wheel 22 and acting upon the wheel spinner are ineffective to cause movement of the wheel spinner with respect to the wheel. Additionally, any tendency for the frictional force resulting from engagement between the tire 20 and the brake shoe 46, as a result of the wheel rotating in the direction indicated by the arrow 29 (FIGS. 2 and 3), to drag the wheel spinner under the wheel 22 is, thus counteracted.

When the spinning motion of the wheel is stopped in the manner described, the operator releases the handles 62 whereupon the springs 65 perform the twofold action previously described. As a result the brake 32 is simultaneously pivoted in a clockwise direction from the operative position engaging the tire as shown in FIG. 3 to the standby position shown in FIG. 2 and the trunnions are raised from transport wheel locking position (FIG. 3) to the released or standby position (FIGS. 2 and 4).

It will be apparent from the previous description that, by use of the apparatus of the present invention, the operator is no longer required to hold the wheel spinner in operating position during the wheel braking operation and, accordingly, his energy and attention can be fully directed toward the single task of stopping rotation of the wheel 22 without delay. As a result, the wheel spinner 10 simplifies the operator's task during the wheel braking operation as compared to that involved in using known wheel spinners.

While a particular embodiment of the present invention has been shown and described it will be understood that the apparatus of the present invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. A portable wheel spinner movable on a support surface into operating position adjacent a spinning wheel comprising a body, brake means carried by said body and movable thereon between standby position and operative braking engagement with the wheel to stop its spinning, wheel spinner immobilizing means mounted for movement on said body between an activated position locking said body against movement on said support surface and a retracted position, said immobilizing means being arranged to be moved to said activated position upon movement of said brake means into braking engagement with the wheel to hold the wheel spinner in fixed position, and means engaging said wheel spinner immobilizing means to retract the same upon release of said brake means for movement from braking engagement with the wheel to standby position.

2. A portable wheel spinner movable on a support surface into operating position adjacent a spinning wheel comprising a body, brake means carried by said body and movable thereon between standby position and operative braking engagement with the wheel to stop its spinning, wheel spinner immobilizing means connected to said brake means and arranged to automatically immobilize the wheel spinner concurrently with the braking operation, and means engaging said brake means and arranged to return the same to standby position from braking engagement with the wheel upon release of said brake means.

3. In a wheel spinner for use in a wheel balancing operation performed on a rotatably mounted wheel, a body, a transport wheel mounted on said body for rotation and arranged to support the wheel spinner for movement from place to place on a surface and into operating position thereon adjacent the wheel, wheel driving means mounted on said body for spinning the mounted wheel, and brake means carried by said body and movable thereon into substantially simultaneous braking engagement with the mounted wheel and with said transport wheel to lock said transport against rotation and thereby immobilize the wheel spinner in operating position while applying a braking force to the mounted wheel to stop its spinning.

4. In a wheel spinner for use in a wheel balancing operation performed on a rotatably mounted wheel, a body, a transport wheel mounted on said body for rotation and arranged to support the wheel spinner for movement from place to place on a surface and into operating position thereon adjacent the mounted wheel, driving means mounted on said body for rotating the mounted wheel, brake means carried by said body and arranged when actuated to move into substantially simultaneous braking engagement with the mounted wheel and with said transport wheel to lock the transport wheel against rotation and thereby immobilize the wheel spinner while applying a braking force to the mounted wheel to stop rotation thereof, and means acting on said brake means for moving the same out of engagement with said transport wheel upon release of said brake means.

5. In a wheel spinner, a body, a transport wheel rotatably mounted on said body and arranged to support the wheel spinner for movement from place to place on a surface and into operating position thereon adjacent a spinning wheel during a wheel balancing operation, brake means carried by said body for applying a braking force to the spinning wheel to bring the same to a stop, and means connected to said brake means and operable to engage and lock said transport wheel against rotation as a result of braking force being applied to the spinning wheel to thereby immobilize the wheel spinner in operating position.

6. In a wheel spinner, a body, a transport wheel rotatably mounted on said body and arranged to support the wheel spinner for movement from place to place on a surface and into operating position thereon adjacent a spinning wheel during a wheel balancing operation, brake means carried by said body and arranged when actuated to apply a braking force to the spinning wheel to bring the same to a stop, means connected to said brake means and operable when said brake means is actuated to engage and lock said transport wheel against rotation as a result of braking force being applied to the spinning wheel to immobilize the wheel spinner in operating position, and means operatively associated with said transport wheel locking means to move the same out of locking engagement with said transport wheel upon release of said brake means.

7. In a wheel spinner for use in a wheel balancing operation performed on a rotably mounted wheel, a body, a transport wheel mounted on said body for rotation and arranged to support the wheel spinner for movement from place to place on a surface and into operating position thereon adjacent the mounted wheel, driving means mounted on said body for rotating the mounted wheel, brake means carried by said body and arranged when actuated to move from standby position into simultaneous braking engagement with the mounted wheel and with said transport wheel to lock the transport wheel against rotation and thereby immobilize the wheel spinner as a result of applying a braking force to the mounted wheel to stop rotation thereof, and means acting on said brake means for moving the same out of engagement with the mounted wheel upon release of said brake means.

8. In a wheel spinner, a body, a transport wheel rotatably mounted on said body and arranged to support the wheel spinner for movement from place to place on a surface and into operating position thereon adjacent a spinning wheel during a wheel balancing operation, brake means carried by said body and arranged when actuated to move from a standby to an operative position to apply a braking force to the spinning wheel to bring the same to a stop, means connected to said brake means and movable when said brake means is actuated to engage and lock said transport wheel against rotation as a result of said braking force being applied to the spinning wheel to immobilize the wheel spinner in operating position, and guide means engaging said transport wheel locking means to guide the same for movement into and out of engagement with said transport wheel and to define a standby position for said transport wheel locking means when said brake means is in its standby position.

9. In a wheel spinner, a body, transport wheel rotatably mounted on said body and arranged to support the wheel spinner for movement from place to place on a surface and into operating position theron adjacent a spinning wheel during a wheel balancing operation, brake means carried by said body and arranged for movement from an inoperative to an operative position to apply a braking force to the spinning wheel to stop its spinning, means connected to said brake means and movable when said brake means is actuated to engage and lock said transport wheel against rotation while said braking force is being applied to the spinning wheel to immobilize the wheel spinner in operating position, guide means engaging said transport wheel locking means to guide the same for movement into and out of engagement with said transport wheel and to define an inoperative position for said transport wheel locking means when said brake means is in its inoperative position, and means engaging said transport wheel locking means and arranged to return the same to its inoperative position upon release of said brake means.

10. A wheel spinner comprising a body, a transport wheel rotatably mounted on the body to support the wheel spinner for movement from place to place on a surface and into operating position thereon adjacent the peripheral surface of a spinning wheel during a wheel balancing operation, a lever carried by the body for movement between released and actuated positions and having a brake shoe engageable with the peripheral surface of the spinning wheel to bring the wheel to a stop when said lever is actuated, and means on said lever movable into locking engagement with said transport wheel to immobilize the wheel spinner in operating position when said lever is moved from released to actuated position to bring the spinning wheel to a stop.

11. A wheel spinner comprising a body, a transport wheel rotatably mounted on the body to support the wheel spinner for movement from place to place on a surface and into operating position thereon adjacent the peripheral surface of a spinning wheel, a lever carried by the body for movement between released and actuated positions and having a brake shoe engageable with the peripheral surface of the spinning wheel to bring the wheel to a stop when said lever is actuated, means on said lever movable into locking engagement with said transport wheel to immobilize the wheel spinner in operating position when said lever is moved from released to actuated position to bring the spinning wheel to a stop, means carried by the body and engaging said lever to guide said transport wheel locking means in a predetermined path during movement of said lever between released and actuated position, and resilient means engaging said transport wheel locking means and arranged to urge the same out of locking engagement with said transport wheel.

12. A wheel spinner comprising a body, a transport wheel rotatably mounted on the body to support said body for movement from place to place on a surface and into operating position thereon adjacent the peripheral surface of a spinning wheel, a lever carried by the body for movement between actuated and released positions and having a brake shoe engageable with the peripheral surface of the spinning wheel to bring the wheel to a stop when said lever is actuated, means on said lever arranged for movement into locking engagement with said transport wheel to immobilize the wheel spinner in operating position when said lever is moved from released to actuated position to bring the spinning wheel to a stop, and resilient means engaging said lever and urging the same from actuated to released position.

13. A wheel spinner comprising a body, a transport wheel rotatably mounted on the body to support the wheel spinner for movement from place to place on a surface and into operating position thereon adjacent the peripheral surface of a spinning wheel, a lever carried by the body and arranged for movement thereon between released and actuated positions and having a brake shoe adjacent one end and an actuating handle adjacent the other end, said brake shoe being engageable with the peripheral surface of the spinning wheel to bring the wheel to a stop when said lever is actuated by use of said handle, a trunnion on said lever overlying said transport wheel and arranged to mount said lever for pivotal movement, and a guide on the body of the wheel spinner engaging said trunnion to guide the same for movement into an actuated positon engaging said transport wheel for locking the same against rotation to immobilize the wheel spinner in operative position when said lever is actuated to stop the spinning wheel and to guide the trunnion for movement out of its actuated position when said lever is released.

14. A wheel spinner comprising a body, a transport wheel rotatably mounted on the body to support the wheel spinner for movement from place to place on a surface and into operating position thereon adjacent the peripheral surface of a spinning wheel during an on-the-car wheel balancing operation, a lever carried by the body for movement thereon between released and actuated positions and having a brake shoe adjacent one end and an actuating handle adjacent the other end, said brake shoe being engageable with the peripheral surface of the spinning wheel when said lever is actuated by use of said handle to bring the spinning wheel to a stop, a trunnion on said lever overlying said transport wheel and arranged to mount said lever for pivotal movement, a torsion spring coiled about said trunnion to provide a bearing therefor and having an outwardly extending end portion, means on the body of the wheel spinner defining a slotted guide having an abutment at one end, the opposite sides of said guide engaging said trunnion being arranged to guide the same for movement from an actuated position engaging said transport wheel for locking the same against rotation to immobilize the wheel spinner in operative position and for movement to a standby position defined by the abutment of said guide when said lever is moved from actuated to released position, and means on the body of the wheel spinner engageable by said spring end portion under the force of said spring to urge said trunnion toward its standby position.

15. A wheel spinner having a body and comprising a transport wheel rotatably mounted on the body to support the wheel spinner for movement from place to place on a surface and into operating position thereon adjacent the peripheral surface of a spinning wheel, a lever carried by the body for movement thereon between released and actuated positions and having a brake shoe adjacent one end and an actuating handle adjacent the other end, said brake shoe being engageable with the peripheral surface of the spinning wheel when said lever is actuated by use of said handle to bring the spinning wheel to a stop, a trunnion on said lever overlying said transport wheel and arranged to mount said lever for pivotal movement, a torsion spring coiled about said trunnion to provide a bearing therefor and having an outwardly extending end portion, means on the body of the wheel spinner defining a guide having an abutment at one end, said guide means being in engagement with opposite sides of said trunnion to guide the same for movement between an actuated position engaging said transport wheel for locking the same against rotation to immobilize the wheel spinner in operative position and a retracted position defined by the abutment of said guide means when said lever is moved from an actuated to released position, and means carried by the body of the wheel spinner and engageable by said spring end portion under the force of said spring to urge said trunnion toward retracted position, said spring end portion also engaging said lever remotely from said trunnion under the force of said spring and urging said lever toward released position.

References Cited in the file of this patent
UNITED STATES PATENTS

| | | |
|---|---|---|
| 2,018,160 | Weaver | Oct. 22, 1935 |
| 2,456,250 | Boudreau | Dec. 14, 1948 |
| 2,557,867 | Forster | June 19, 1951 |
| 2,728,236 | Hemmeter | Dec. 27, 1955 |
| 2,731,841 | Merrill et al. | Jan. 24, 1956 |
| 2,823,547 | Hosking | Feb. 18, 1958 |